Figure 1:
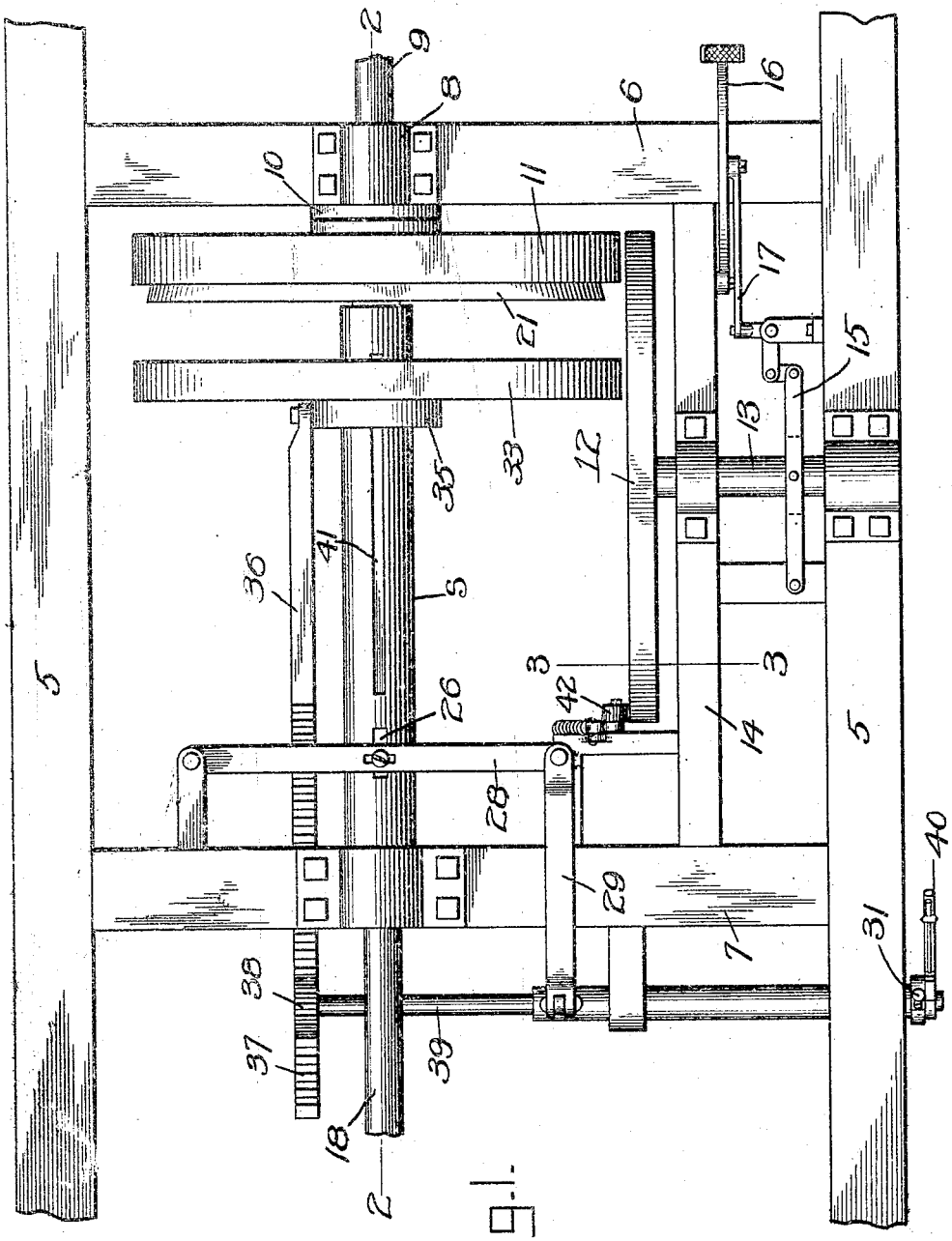

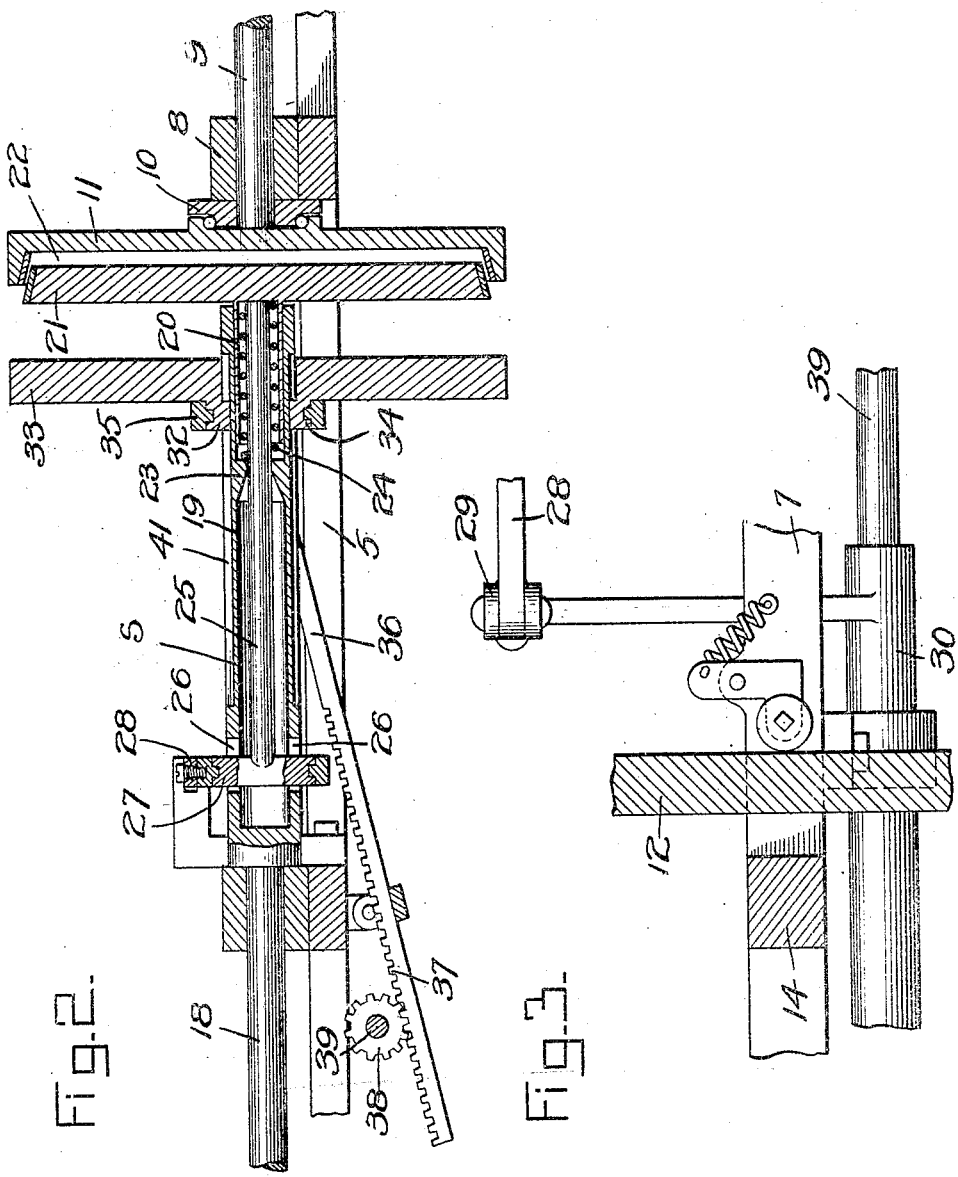

UNITED STATES PATENT OFFICE.

GROVER IRA MITCHELL, OF CORNELL, ILLINOIS.

TRANSMISSION-GEARING FOR AUTOMOBILES.

No. 896,034.

Specification of Letters Patent.

Patented Aug. 11, 1908.

Application filed April 4, 1908. Serial No. 425,105.

*To all whom it may concern:*

Be it known that I, GROVER IRA MITCHELL, a citizen of the United States, residing at Cornell, in the county of Livingston and State of Illinois, have invented a new and useful Transmission-Gearing for Automobiles; and I do hereby declare the following to be a full, clear, and exact description of the invention, such as will enable others skilled in the art to which it appertains to make and use the same.

This invention relates to transmission gearing for motor vehicles; and it has for its object to simplify and improve the construction and operation of this class of devices, and to provide a transmission gearing which shall admit of the vehicle being operated by direct transmission, at a high rate of speed, or by intermediate friction gearing at any rate of speed that may be desired, at the pleasure and election of the operator.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings—Figure 1 is a top plan view of a transmission gearing constructed in accordance with the invention. Fig. 2 is a longitudinal sectional view taken on the plane indicated by the line 2—2 in Fig. 1. Fig. 3 is a detail view, in sectional elevation, taken on the plane indicated by the line 3—3, in Fig. 1.

Corresponding parts in the several figures are denoted by like characters of reference.

A suitable frame is provided which includes the side-bars 5, 5, and cross-pieces 6 and 7, which will be referred to in the following description as the front and rear cross-bars respectively. Supported for rotation upon the front cross-bar 6, which is provided with a bearing 8 is a shaft 9 which is intended to be driven from the motor direct; said shaft being provided with a thrust-bearing 10 which may be an anti-friction bearing of any suitable construction; the shaft 9 also carries a wheel or disk 11, the peripheral edge of which is adapted for frictional contact with the face of a disk 12 carried by a shaft 13, which is supported for rotation upon one of the side-bars of the frame, an additional bearing for said shaft being provided upon a longitudinal frame-bar 14. The shaft 13 is supported slidably in its bearings, and it may be adjusted longitudinally of its axis, by means of a lever 15 capable of being actuated by a suitable treadle 16 through the medium of a system of intermediate links, bell-cranks and other connecting means, as indicated at 17, it being understood that any suitable means may be employed for actuating the adjusting lever 15, and that the latter may be connected with the slidable shaft 13 in any suitable well-known manner.

Supported for rotation upon the rear cross-bar 7 of the frame, in axial alinement with the shaft 9 is the transmission shaft S having a solid rear portion 18 and a tubular front portion 19, which latter externally engages a sleeve 20 carrying a friction cone or clutch member 21 adapted for frictional engagement with a recess 22 in the rear face of the wheel or disk 11 carried by the motor driven shaft 9. The tubular shaft portion 19 has an internal shoulder or offset 23 affording a bearing for one end of a coiled spring 24, the opposite end of which is disposed to bear against the rear side of the clutch member 21, so that the latter by the action of said spring may be forced into frictional engagement with the walls of the recess 22 in the rear side of the disk 11. A link or rod 25, suitably connected with the clutch member 21, extends longitudinally through the coiled spring 24 and through the tubular shaft-section 19 which latter is provided with a slot or aperture 26 through which the rod 25 is suitably connected with an annularly grooved pin 27, which is slidably mounted upon the said tubular shaft-section where it is capable of adjustment by means of a shipping lever 28 actuated by means of a link 29 and a rock-shaft 30 having an operating lever or handle 31. It will be readily seen that by manipulating the latter handle the spring 24 may be compressed, to disengage the clutch member 21 from the disk 11, or said spring may be released to place said cone and disk in frictional engagement for the transmission of motion, when desired.

Slidably mounted upon the shaft section 19 is a hub or collar 32 carrying a disk 33, the peripheral edge of which is adapted for frictional engagement with the face of the friction disk 12; the hub 32 has an annular groove 34 engaged by a ring 35 connected with a shipping rod 36 one end of which is equipped with a rack 37 engaged by a pinion 38 upon a rock-shaft 39 which is capable of being operated by a lever or handle 40, for the purpose of effecting adjustment of the friction wheel 33, axially upon its supporting shaft, and towards or from the center of the friction disk 12. A spline 41 serves to connect the hub or collar 32 for rotation with the tubular portion 19 of the shaft S; the speed of rotation of the latter being governed by the position of the wheel 33 relative to the friction-disk 12, when the latter is in use. A spring supported idler 42 is arranged to engage the face of the friction disk 12 in a position about diametrically opposite to the contact points of the wheels 11 and 33 with the face of said disk.

From the foregoing description taken in connection with the drawings hereto annexed, the operation and advantages of this invention will be readily understood by those skilled in the art to which it appertains. By operating the treadle 16 the friction disk 12 may be placed in engagement with the periphery of the disk or wheel 11 carried by the motor driven shaft 9, and said disk 12 will transmit motion to the shaft S through the medium of the wheel 33, the speed being regulated by the position of said wheel 33 relative to the center of the disk 12. When a direct drive at high speed is desired, the lever 31 is operated to place the cone-clutch member 21 in engagement with the walls of the recess 22 in the wheel 11, and motion will thus be transmitted from the latter direct to the shaft S which is geared in the usual manner to the rear axle.

By this improved gearing the speed may be changed gradually from low to high, and the direct transmission device may be thrown into operation at any time without interfering with the friction-gearing which is used for the transmission of low speed. The construction is simple, inexpensive, and thoroughly efficient for the purposes for which it is provided.

Having thus described my invention, I claim and desire to secure by Letters Patent of the United States—

1. In a transmission gearing for automobiles, a motor-driven shaft having a thrust bearing, a wheel upon said shaft having a friction rim, a transmission shaft suitably supported in axial alinement with the motor-driven shaft, a hub supported slidably and adjustably upon the transmission shaft for rotation therewith and carrying a wheel having a friction-rim, a shaft supported slidably at right-angles to the motor driven shaft a friction disk carried by said motor driven shaft adapted for engagement with the rims of the wheels upon the motor-driven shaft and the transmission shaft, and a spring supported idler adapted for engagement with the face of the friction disk.

2. In a transmission gearing for automobiles, a motor-driven shaft, a transmission shaft supported in axial alinement therewith and having a tubular portion, a friction wheel upon the motor-driven shaft having a conical recess, a spring actuated sleeve slidable in the tubular portion of the transmission shaft a clutch member carried by said transmission shaft adapted to engage the recess in the friction wheel upon the motor-driven shaft, means for compressing the spring to release the cone-pulley, and means independent of the clutch member for conveying motion to the transmission shaft from the motor-driven shaft.

3. In a transmission gearing for automobiles, a motor-driven shaft, a friction wheel upon said shaft having a recess, a transmission shaft supported in axial alinement with the motor-driven shaft and having a tubular portion, a spring actuated sleeve slidable in said tubular portion a cone-clutch member connected with said slidable sleeve facing the recess in the wheel upon the motor-driven shaft, means for compressing the spring to effect adjustment of the cone-pulley, a hub supported slidably upon the transmission shaft and carrying a wheel having a friction rim, a shaft supported slidably at right angles to the motor driven shaft a friction disk carried by said motor driven shaft adapted for engagement with the rims of the wheels upon the motor-driven and the transmission shafts and means for effecting adjustment of the slidable shaft.

4. In a transmission gearing for automobiles, a suitably supported motor-driven shaft, a wheel mounted upon said shaft provided with a conical recess in the rear face thereof, in combination with a transmission shaft supported for rotation in axial alinement with said motor-driven shaft and having a tubular portion provided with an internal shoulder, a sleeve slidable in the tubular shaft section a clutch member connected to said tubular shaft engaging the recess in the wheel upon the motor-driven shaft, a spring coiled within said sleeve and tubular shaft section between the clutch member upon the sleeve and the shoulder in the shaft section; an operating rod connected with the cone-clutch member and extending axially through the shaft, and operating means connected with said rod through a slot in the tubular shaft section.

In testimony whereof I have signed my name to this specification in the presence of two subscribing witnesses.

GROVER IRA MITCHELL.

Witnesses:
A. E. TIFFANY,
P. H. JONES.